United States Patent [19]

Komori

[11] Patent Number: 4,590,525
[45] Date of Patent: May 20, 1986

[54] RECORDING BIAS OSCILLATING CIRCUIT

[75] Inventor: Yuji Komori, Yokohama, Japan

[73] Assignee: Tokyo Shibaura Denki Kabushiki Kaisha, Kawasaki, Japan

[21] Appl. No.: 465,632

[22] Filed: Feb. 10, 1983

[30] Foreign Application Priority Data

Feb. 12, 1982 [JP] Japan .................................. 57-20807
Feb. 12, 1982 [JP] Japan .................................. 57-20808
Feb. 12, 1982 [JP] Japan .................................. 57-20819

[51] Int. Cl.⁴ .......................... G11B 5/47; G11B 5/02
[52] U.S. Cl. ......................................... 360/66; 360/68
[58] Field of Search ..................... 360/15, 66, 29, 13, 360/22, 68; 331/55, 47, 48, 56

[56] References Cited

U.S. PATENT DOCUMENTS 2,920,146  1/1960  Grift et al. ........................... 360/66
4,297,649 10/1981  Shuelz et al. ........................ 331/55

FOREIGN PATENT DOCUMENTS 45-10053  5/1970  Japan ................................... 360/60

OTHER PUBLICATIONS

Markus, "Electronic Circuits Manual", p. 391, 1971, New York.
Chr. Scolz, Magnetbandspeichertechnik, 2nd Edition, VEB Verlag Technik Berlin, 1969, pp. 174, 175.
Japanese Publication Entitled "NHK Television Technique Text", pp. 105-108, Section 3.4.1 Sync. Circuit, published by Nippon Hoso Kyokai, copyrighted 1971.

Primary Examiner—Vincent P. Canney
Attorney, Agent, or Firm—Finnegan, Henderson, Farabow, Garrett & Dunner

[57] ABSTRACT

A recording bias oscillating circuit for use in apparatus of the type having at least two independent tape recorder sections. The circuit is provided with at least two recording heads respectively corresponding to the tape recorder sections for recording signals on tapes. The recording heads are supplied with bias signals from independent bias oscillators. The bias oscillators are connected to each other through a coupling device for synchronizing the frequencies of the bias oscillators thereby preventing beat noises caused by a frequency difference between recording bias oscillating signals.

14 Claims, 9 Drawing Figures

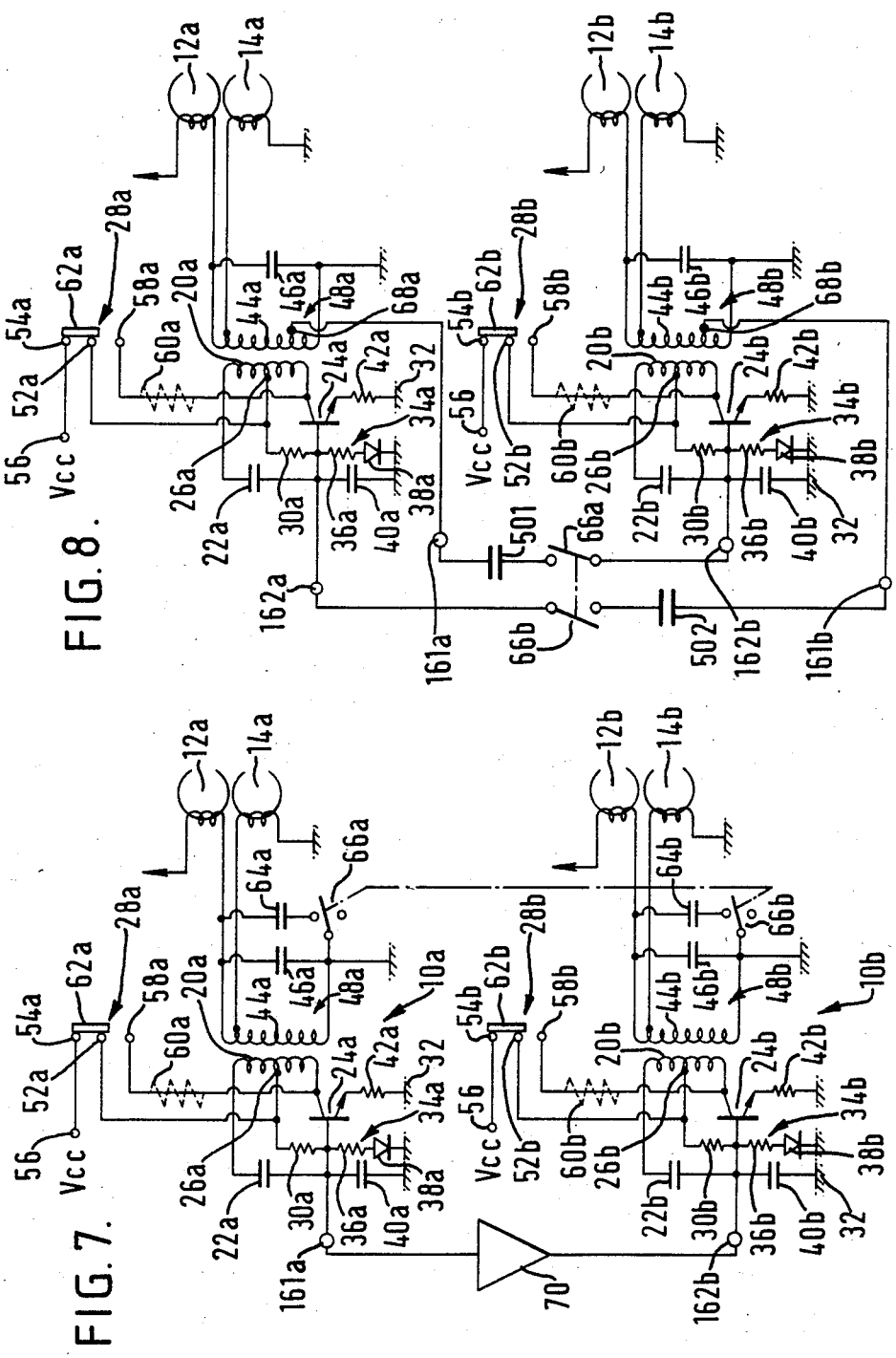

RECORDING BIAS OSCILLATING CIRCUIT

BACKGROUND OF THE INVENTION

1. Field of the Invention

The present invention is related to a recording bias oscillating circuit of a tape recorder apparatus and, more particularly, to a recording bias oscillating circuit of an apparatus of the type having multiple tape recorder sections.

2. Description of the Prior Art

Recently, it has been developed to combine multiple tape recorders, for example, two independent tape recorders in an apparatus for increasing convenience of using the apparatus. This is, in such apparatus, users are easily able to copy a recorded tape onto another tape or are able to enjoy reproduction or playback of a recorded tape while carrying on a recording on another tape. The apparatus of the conventional type usually has a tape recorder section capable of both recording and reproducing and a tape player section only capable of reproduction or playback.

The applicant of this invention has designed an apparatus that has two similar tape recorder sections, each capable of both recording and reproducing. In such apparatus, the users are able to carry on recordings on two tapes simultaneously. It is, however, found that such apparatus has a problem that a beat noise between recording bias frequencies of the respective tape recorder sections occurs and that the beat noise is recorded on the tapes when both tape recorder sections are in a recording mode. The beat noise usually appears in an audible frequency band so that the beat noise interferes with the recorded information on the tapes.

Accordingly, an object of the invention is to prevent beat noises caused by a frequency difference between recording bias oscillating signals of respective tape recorder sections in an apparatus of the type having multiple tape recorder sections.

Another object of the invention is to reduce leaking of a recording bias signal of one tape recorder section in its recording mode into another recorder section in its reproducing mode.

A further object of the invention is to prevent beat noises between the recording bias frequency of a tape recorder section and a radio frequency of a tuner section in an apparatus of the type having multiple tape recorder sections and a radio tuner section.

SUMMARY OF THE INVENTION

To achieve the foregoing objects and in accordance with the purposes of the invention, as embodied and broadly described herein, a recording bias oscillating circuit for an apparatus of the type having multiple tape recorder sections is provided comprising at least two independent recording heads respectively corresponding to the tape recorder sections for recording signals on tapes loaded on the tape recorder sections; at least two independent bias oscillators for providing to the recording heads bias signals with frequencies close to each other; and means for coupling the bias oscillators to each other for synchronizing the frequencies. Each of the bias oscillators has a synchronous terminal, and, preferably, the coupling means is a capacitor connected between the synchronous terminals.

BRIEF DESCRIPTION OF THE DRAWINGS

Additional objects and advantages of the present invention will become apparent to persons skilled in the art from a study of the accompanying drawings and detailed description of the invention.

Of the drawings which are incorporated in and constitute a part of this specification:

FIG. 7 is a circuit diagram of a modification of the circuit diagram shown in FIG. 6;

FIG. 8 is a circuit diagram of another modification of the circuit diagram shown in FIG. 6.

DESCRIPTION OF THE PREFERRED EMBODIMENT

Figure 2:
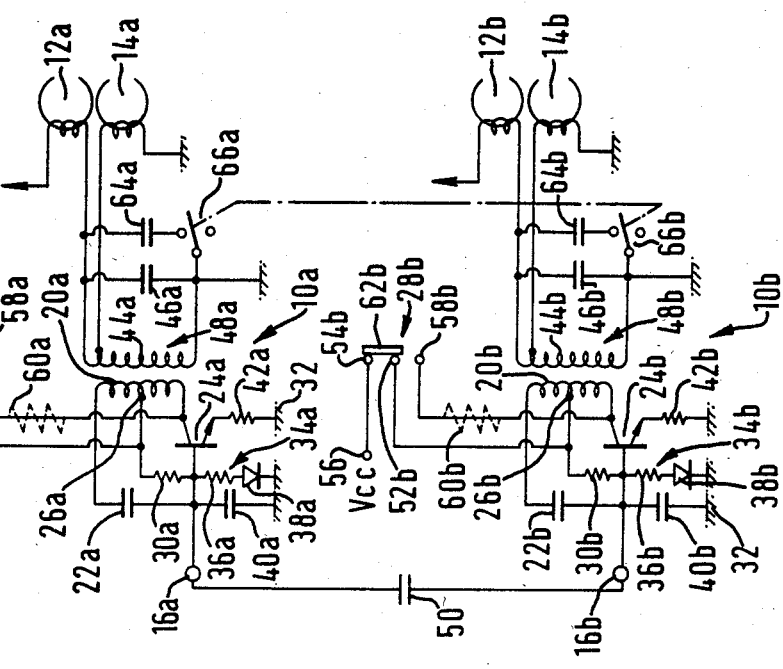
FIG. 2 is a circuit diagram of the basic construction shown in FIG. 1.

The present invention will be described in detail with reference to FIGS. 1 through 9. Throughout the drawings, like reference numerals or symbols will be used to designate like or equivalent portions, for the sake of simplicity of explanation.

Figure 1:
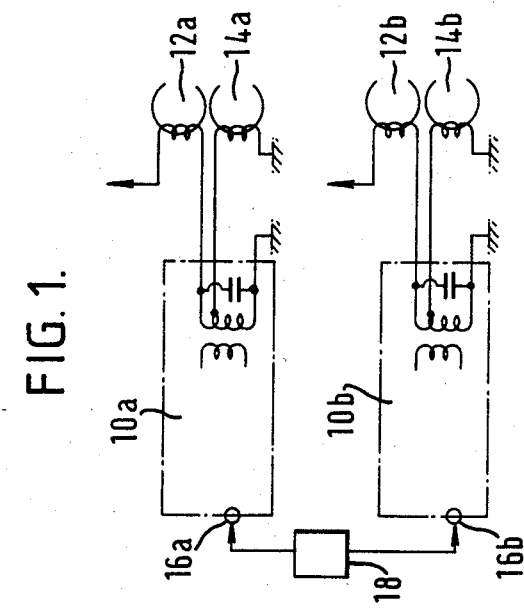
FIG. 1 is a diagram of a basic construction of a recording bias oscillating circuit according to the invention.

FIG. 1 shows a basic construction of a recording bias oscillating circuit which is equipped in, for example, an apparatus with two tape recorder sections and a radio section. As shown in FIG. 1, first and second bias oscillators 10a, 10b are respectively connected to corresponding recording heads 12a, 12b and corresponding erasing heads 14a, 14b. First and second bias oscillators 10a, 10b are each designed to oscillate at frequencies relatively close to each other, for example, about 100 KHz.

First and second bias oscillators 10a, 10b are connected to each other at their synchronous terminals 16a, 16b through connecting circuit 18. Through connecting circuit 18, respective oscillating signals of first and second bias oscillators 10a, 10b are respectively controlled to oscillate at a unitary synchronous frequency. The recording bias signals at first and second bias oscillators 10a, 10b with the unitary synchronous frequency are respectively applied to recording heads 12a, 12b and erasing heads 14a, 14b.

FIG. 2 shows a circuit diagram of the basic construction shown in FIG. 1. As shown in FIG. 2, a conventional LC oscillating circuit design is used for the first and second bias oscillators 10a, 10b. That is, in first bias oscillator 10a, for example, a series circuit of primary coil 20a and capacitor 22a is connected between a collector electrode and a base electrode of transistor 24a. Intermediate tap 26a of primary coil 20a is connected to selector switch 28a which will be described in detail later, and further connected to the base electrode of transistor 24a through resistor 30a. The base electrode of transistor 24a is connected to reference terminal 32 through series bias circuit 34a of resistor 36a and forward biased diode 38a for transistor 24a and through capacitor 40a connected in parallel with series bias circuit 34a. An emitter electrode of transistor 24a is connected to reference terminal 32 through resistor 42a.

Secondary coil 44a is electromagnetically connected to primary coil 20a. Secondary coil 44a is connected to capacitor 46a in parallel so as to form tank circuit 48a. One end of tank circuit 48a is connected to reference terminal 32, and the other end of tank circuit 48a is connected to recording head 12a. Further, an intermediate tap of secondary coil 44a is connected to erasing head 14a.

As shown in FIG. 2, second bias oscillator 10b has the same circuit construction with first bias oscillator 10a, the reference numerals of like portion being designated with a "b" instead of an "a".

The base electrodes of transistors 24a, 24b of first and second bias oscillators 10a, 10b are connected to respective synchronous terminals 16a, 16b. Synchronous terminals 16a, 16b are connected together through coupling capacitor 50. When both first and second bias oscillators 10a, 10b are simultaneously activated, the oscillating signals on the base electrodes of transistors 24a, 24b operate through coupling capacitor 50 so as to synchronize the frequency of each oscillating signal to a unitary frequency. Thus both bias oscillators 10a, 10b oscillate at a unitary synchronized frequency.

Selector switches 28a, 28b respectively have first terminals 52a, 52b connected to intermediate taps 26a, 26b of primary coils 20a, 20b, second terminals 54a, 54b connected to power source 56, third terminals 58a, 58b connected to the collector electrodes of transistors 24a, 24b directly or through resistors 60a, 60b (as shown by broken lines in FIG. 2) and selectors 62a, 62b for selectively connecting first terminals 52a, 52b to second terminals 54a, 54b or third terminals 58a, 58b. Selector switches 28a, 28b connect intermediate taps 26a, 26b to power source 56 or to the collector electrodes of transistors 24a, 24b, respectively, in accordance with operations of the corresponding tape recorder sections for a recording mode or a reproducing mode. That is, in the recording mode source voltage Vcc of power source 56 is supplied to intermediate tap 26a (26b).

On the other hand, in the reproducing mode a part of primary coil 20a (20b) is shunted so that the Q factor of bias oscillator 10a (10b) is extremely damped. Therefore, when one bias oscillator 10a (10b) is deactivated according to the reproducing operation of the corresponding tape recorder section while the other bias oscillator 10b (10a) is activated according to the recording operation of the corresponding tape recorder section, bias oscillator 10a (10b) being deactivated is prevented from outputing a signal caused by an electromagnetic coupling between bias oscillators 10a, 10b.

To tank circuits 48a, 48b, series circuits of capacitors 64a, 64b and beat cancel switches 66a, 66b are connected, in parallel, respectively. Beat cancel switches 66a, 66b are interlockingly operated to connect or disconnect capacitors 64a, 64b to or from tank circuits 48a, 48b so that tuned frequencies at tank circuits 48a, 48b, in this case the synchronous frequency, is slightly shifted or varied in accordance with the connection and the disconnection of capacitors 64a, 64b. Therefore, when a radio signal of the tuner section (not shown) occurs and a beat noise between a frequency of the radio signal and the synchronous frequency of the recording bias signal appears, the users are able to vary the synchronous frequency to a different synchronous frequency in order to prevent a beat noise problem by switching the connection and the disconnection of capacitors 64a, 64b. The variation of the synchronous frequency is generally selected to about 2 or 3 KHz in practical circuit design.

Figures 3, 4:
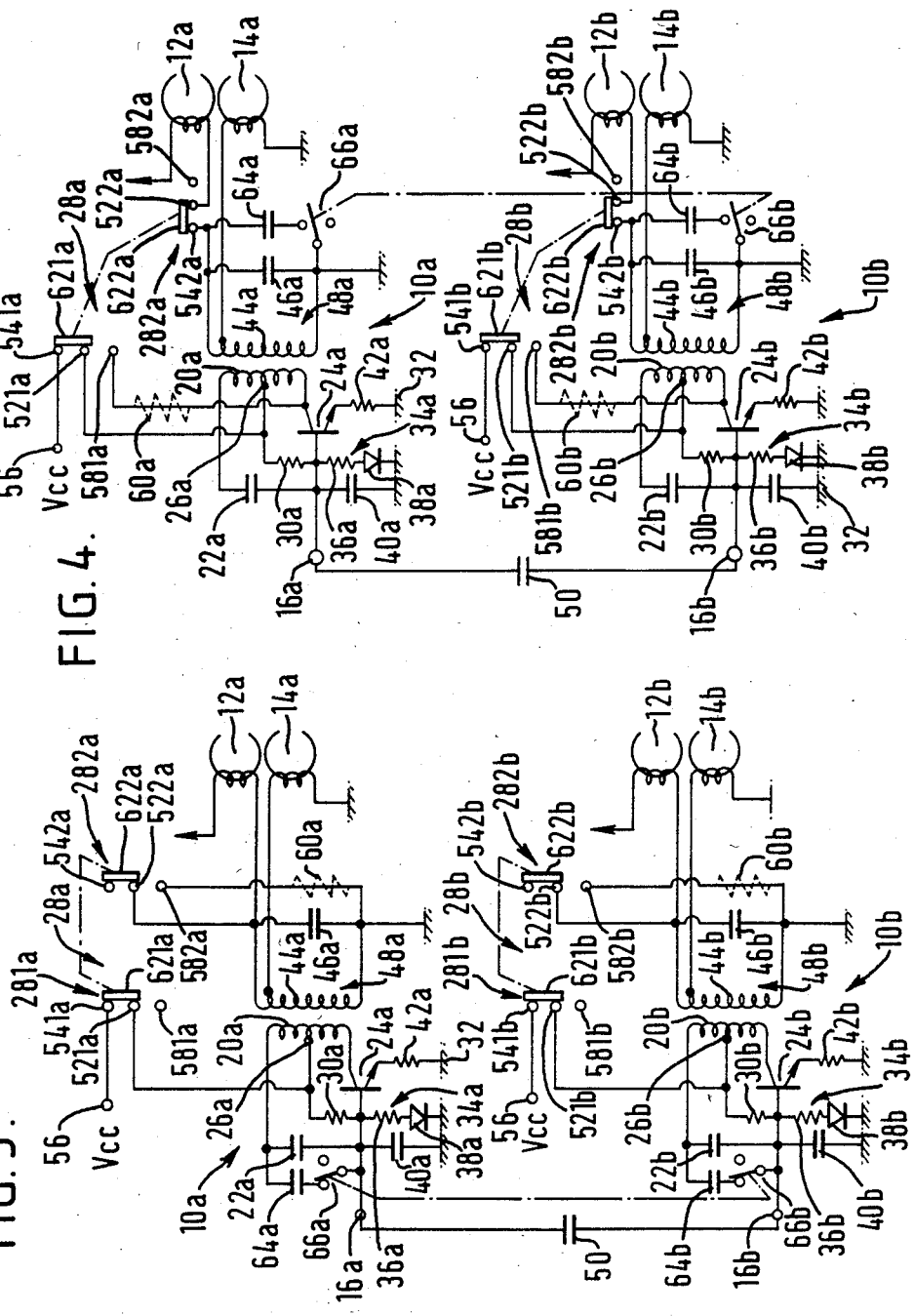
FIG. 3 is a circuit diagram of a modification of the circuit diagram shown in FIG. 2.
FIG. 4 is another modification of the circuit diagram shown in FIG. 2.

FIG. 3 shows a circuit diagram of a modification of the circuit shown in FIG. 2. The circuit of FIG. 3 is similar to the circuit of FIG. 2 except for some portions described hereinafter. Selector switches 28a, 28b of first and second bias oscillators 10a, 10b are respectively divided into two switch sections 281a, 282a and 281b, 282b. Two switch sections 281a (281b), 282a (282b) of selector switch 28a (28b) are interlockingly operable. In switch section 281a (281b), first and second terminals 521a (521b), 541a (541b) are respectively connected to intermediate tap 26a (26b) of primary coil 20a (20b) and power source 56 while third terminal 581a (581b) is disconnected.

In switch section 282a (282b), first and third terminals 522a (522b), 582a (582b) are respectively connected to opposite ends of tank circuit 48a (48b) while second terminal 542a (542b) is disconnected. Interlockingly operable selectors 621a (621b), 622a (622b) of respective switch sections 281a (281b), 282a (282b) operate to supply power source voltage Vcc of power source 56 to intermediate tap 26a (26b) and disconnect the opposite ends of tank circuit 48a (48b) according to the recording operation of the corresponding tape recorder section.

On the other hand, selectors 621a (621b), 622a (622b) operate to cut off power source voltage Vcc from bias oscillator 10a (10b) and shunt the opposite ends of tank circuit 48a (48b) according to the reproducing operation of the corresponding tape recorder section. Further, series circuits of capacitors 64a, 64b and beat cancel switches 66a, 66b are respectively connected to capacitors 22a, 22b in parallel.

FIG. 4 shows a circuit diagram of a modification of the FIG. 2 or FIG. 3. In FIG. 4, switch sections 282a, 282b of selector switches 28a, 28b are inserted in the output lines for recording heads 12a, 12b so that first (second) bias oscillator 10a (10b) is cut off from recording head 12a (12b) when the corresponding tape recorder section is in reproducing operation mode.

Figure 5:
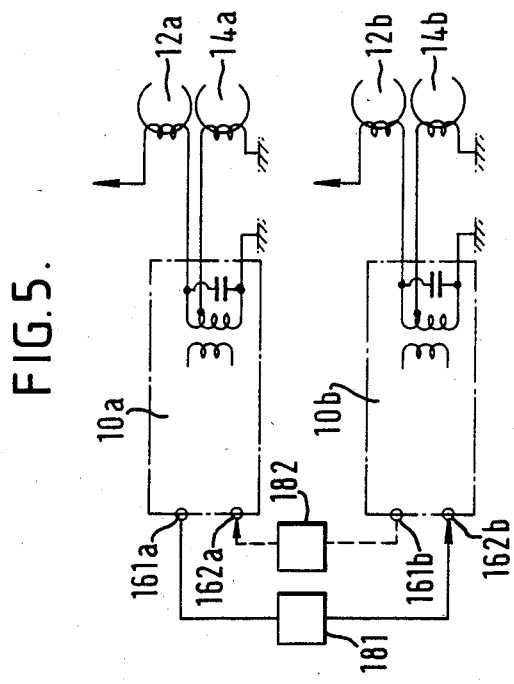
FIG. 5 is a diagram of another basic construction of a recording bias oscillating circuit according to the invention.

Fig. 5 shows another basic construction of a recording bias oscillating circuit of the invention. The device of FIG. 5 is very similar to that in FIG. 2 except that connecting circuit 181 is connected between synchronous signal output terminal 161a of first bias oscillator 10a and synchronous signal input terminal 162b of second bias oscillator 10b. Therefore, the oscillating frequency of second bias oscillator 10b is controlled to synchronize with the oscillating frequency of first bias oscillator 10a.

In FIG. 5, connecting circuit 182 (shown by a broken line) can be used to connect synchronous signal output terminal 161b of second bias oscillator 10b and synchronous signal input terminal 162a of first bias oscillator 10a. In this case, both first and second bias oscillators 10a, 10b are controlled to synchronize with a unitary synchronous frequency similar to that of FIG. 1.

Figure 6:
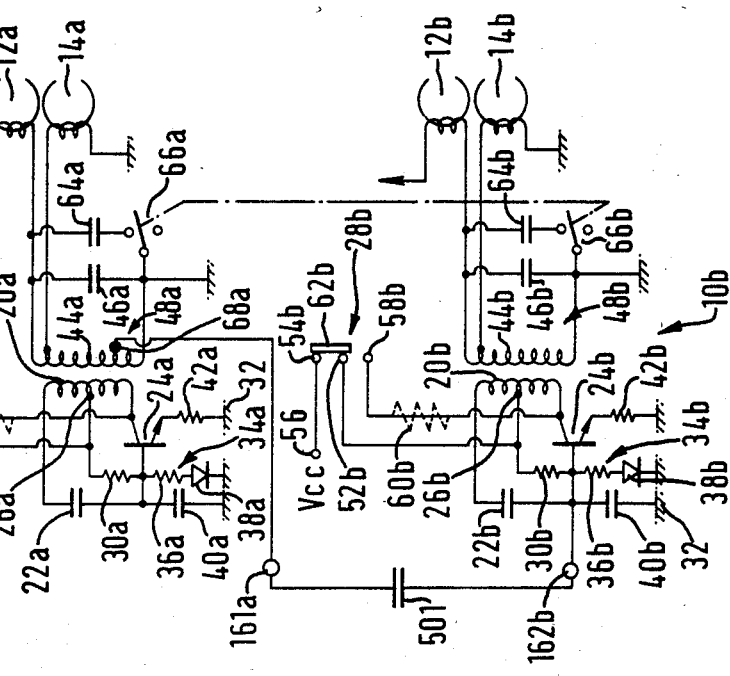
FIG. 6 is a circuit diagram of the basic construction shown in FIG. 5.

FIG. 6 shows a circuit diagram of the modification shown in FIG. 5. FIG. 6 is similar to FIG. 2, but coupling capacitor 501 is connected between intermediate tap 68a of secondary coil 44a as synchronous signal output terminal 161a of first bias oscillator 10a and the base electrode of transistor 24b as synchronous signal input terminal 162b of second bias oscillator 10b. The oscillating signal output of first bias oscillator 10a is applied to the base electrode of transistor 24b of second bias oscillator 10b through coupling capacitor 501, and the oscillating frequency of second bias oscillator 10b is synchronized with the oscillating frequency of first bias oscillator 10b. In a similar manner, optional connecting circuit 182 can be placed between first and second bias oscillators 10a, 10b.

FIG. 7 shows a circuit diagram of another modification of FIG. 6. FIG. 7 is also very similar to FIG. 2, but buffer amplifier 70 is connected at its input terminal to the base electrode of transistor 24a as synchronous signal output terminal 161a of first bias oscillator 10a and connected at its output terminal to the base electrode of transistor 24b as synchronous signal input terminal 162b of second bias oscillator 10b. Therefore, the oscillating frequency of second bias oscillator 10b is controlled to synchronize with the oscillating frequency of first bias oscillator 10a similar to the circuit shown in FiG. 6.

FIG. 8 shows a circuit diagram of still another modification of FIG. 6. FIG. 8 is similar to FIG. 2 except that series circuits of coupling capacitors 501, 502 and beat cancel switches 66a, 66b are respectively connected between intermediate taps 68a, 68b of secondary coils 44a, 44b of first and second bias oscillators 10a, 10b and the base electrodes of transistors 24b, 24a.

Beat cancel switches 66a, 66b are interlockingly operable but opposite in their ON and OFF operations to each other. Therefore, either of coupling capacitors 501 and 502 is selectively connected and the other is disconnected simultaneously by the interlocking operation of beat cancel switches 66a, 66b. Therefore, when a radio frequency of the tuner section (not shown) occurs and a beat noise between the bias signal frequency of first bias oscillator 10a and the radio frequency appears, the users are able to operate beat cancel switches 66a, 66b so as to change to the bias signal frequency of second bias oscillator 10b, and vice versa.

Figure 9:
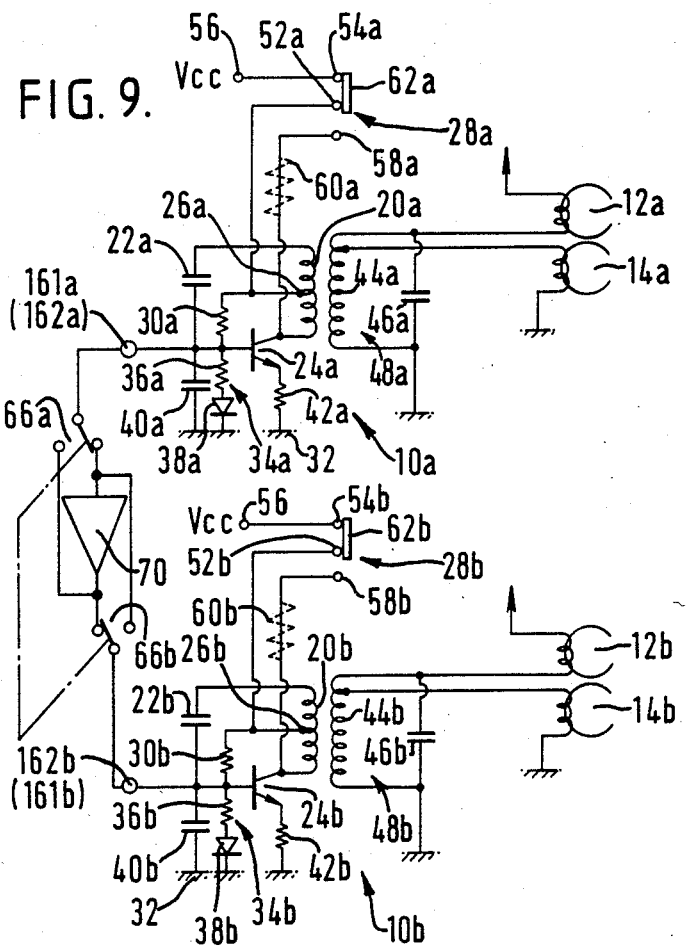
FIG. 9 is a circuit diagram of a modification of the circuit diagram shown in FIG. 7.

FIG. 9 shows a circuit diagram of a modification of FIG. 7. FIG. 9 is also almost the same as FIG. 2, but a series circuit of one beat cancel switch 66a, buffer amplifier 70 and the other beat cancel switch 66b is connected between the base electrodes of transistors 24a and 24b of first and second bias oscillators 10a and 10b. Beat cancel switches 66a, 66b are interlockingly operable and operate to change connections of input and output terminals of buffer amplifier 70 to first and second bias oscillators 10a, 10b. Therefore, the users are able to prevent a beat noise between a radio frequency and the recording bias frequency by selecting either frequency of first and second bias oscillators 10a, 10b similar to that in the circuit shown in FIG. 8.

What is claimed is:

1. Recording bias oscillating circuit for an apparatus of the type having multiple independent tape recorder sections, said circuit comprising:
    at least two independent recording heads respectively corresponding to said tape recorder sections for recording signals on tapes loaded on said tape recorder sections;
    at least two independent bias oscillators for providing to said recording heads respectively bias signals with frequencies close to each other; and
    means for coupling said bias oscillators to each other for synchronizing said frequencies,
    wherein one of said bias oscillators has a synchronous signal output terminal and the other of said bias oscillators has a synchronous signal input terminal, and said coupling means is a capacitor connected between said synchronous output terminal and said synchronous signal input terminal.

2. Recording bias oscillating circuit for an apparatus of the type having multiple independent tape recorder sections, said circuit comprising:
    at least two independent recording heads respectively corresponding to said tape recorder sections for recording signals on tapes loaded on said recorder sections;
    at least two independent bias oscillators for providing to said recording heads respectively bias signals with frequencies close to each other; and
    means for coupling said bias oscillators to each other for synchronizing said frequencies,
    wherein one of said bias oscillators has a synchronous signal output terminal and the other of said bias oscillators has a synchronous signal input terminal and said coupling means is a buffer amplifier connected between said synchronous signal output terminal and said synchronous signal input terminal.

3. Recording bias oscillating circuit for an apparatus of the type having multiple independent tape recorder sections, said circuit comprising:
    at least two independent recording heads respectively corresponding to said tape recorder sections for recording signals on tapes loaded on said tape recorder sections;
    at least two independent bias oscillators for providing to said recording heads respectively bias signals with frequencies close to each other; and
    means for coupling said bias oscillators to each other for synchronizing said frequencies,
    wherein each of said oscillators has a synchronous signal output terminal and a synchronous signal input terminal, said coupling means is a capacitor, and said capacitor is connected between a synchronous signal output terminal of one of said bias oscillators and a synchronous signal input terminal of the other of said bias oscillators.

4. Recording bias oscillating circuit according to claim 3, further comprising:
    means for switching the connection of said capacitor to the synchronous signal output and input terminals of said bias oscillators alternately.

5. Recording bias oscillating circuit for an apparatus of the type having multiple independent tape recorder sections, said circuit comprising:
    at least two independent recording heads respectively corresponding to said tape recorder sections for recording signals on tapes loaded on said tape recorder sections;
    at least two independent bias oscillators for providing to said recording heads respectively bias signals with frequencies close to each other;
    means for coupling said bias oscillators to each other for synchronizing said frequencies;
    means for deactivating at least one of said bias oscillators in accordance with a reproducing operation mode of said corresponding tape recorder section; and
    means for suppressing an output signal of said one deactivated bias oscillator, said output signal being caused by an electromagnetic coupling between said bias oscillators.

6. Recording bias oscillating circuit according to claim 5, wherein said suppressing means is a shunt circuit for said one deactivated bias oscillator.

7. Recording bias oscillating circuit according to claim 6, wherein each of said bias oscillators has at least two output terminals and said shunt circuit is connected to said output terminals of said one deactivated bias oscillator.

8. Recording bias oscillating circuit according to claim 6, wherein said bias oscillators have oscillating coils and said shunt circuit is connected to said oscillating coil of said one deactivated bias oscillator.

9. Recording bias oscillating circuit according to claim 8, wherein said shunt circuit is a conductive wire.

10. Recording bias oscillating according to claim 8, wherein said shunt circuit comprises a resistor.

11. Recording bias oscillating circuit for an apparatus of the type having multiple independent tape recorder sections, said circuit comprising:
at least two independent recording heads respectively corresponding to said tape recorder sections for recording signals on tapes loaded on said tape recorder sections;
at least two independent bias oscillators for providing to said recording heads respectively bias signals with frequencies close to each other;
means for coupling said bias oscillators to each other for synchronizing said frequencies;
means for shifting oscillator frequencies of said bias oscillators; and
means for operating said shifting means interlockingly,
wherein each of said bias oscillators includes an oscillation frequency defining circuit having a capacitor and said shifting means of each said oscillator is a frequency shifting capacitor connected to said oscillation frequency defining circuit and in parallel to said capacitor of said oscillation frequency defining circuit.

12. Recording bias oscillating circuit according to claim 11, wherein said oscillation frequency defining circuit comprises a capacitor and a coil, said capacitor and said coil being connected in series and constituting a tank circuit.

13. Recording bias oscillating circuit for an apparatus of the type having multiple independent tape recorder sections, said circuit comprising:
at least two independent recording heads respectively corresponding to said tape recorder sections for recording signals on tapes loaded on said tape recorder sections;
at least two independent bias oscillators for providing to said recording heads respectively bias signals with frequencies close to each other;
means for coupling said bias oscillators to each other for synchronizing said frequencies,
wherein each of said bias oscillators has a synchronous signal output terminal and a synchronous signal input terminal, and said coupling means is a buffer amplifier connected between a synchronous signal output terminal of one of said bias oscillators and a synchronous signal input terminal of the other said bias oscillators.

14. Recording bias oscillating circuit according to claim 13, further comprising:
means for reversing the connection of said buffer amplifier to the synchronous signal output and input terminals of said bias oscillators alternately.

* * * * *